S. M. SKIDMORE.
Velocipede.
No. 88,815.
Patented April 13, 1869.
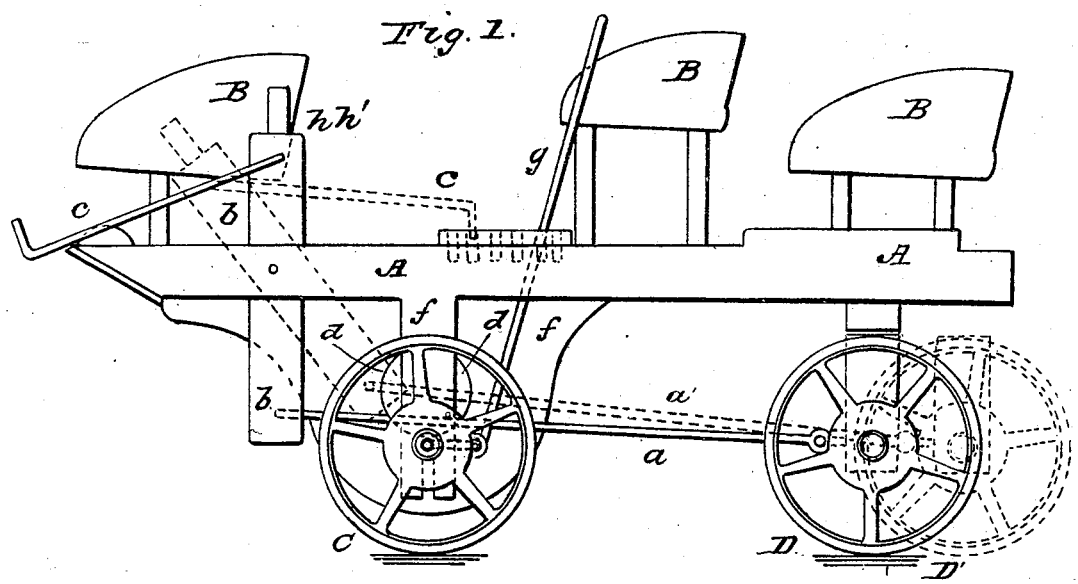
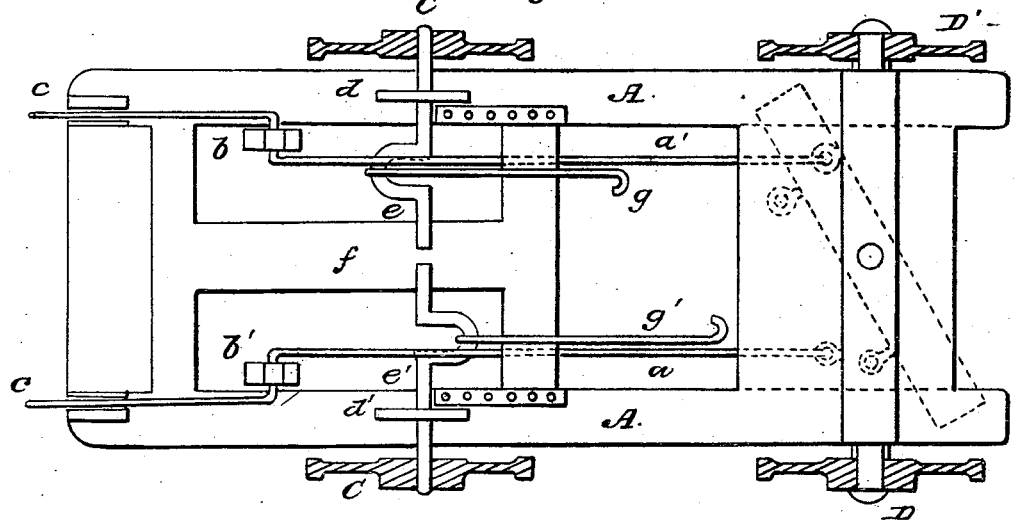

SAMUEL M. SKIDMORE, OF BROOKLYN, NEW YORK.

*Letters Patent No. 88,815, dated April 13, 1869.*

IMPROVED VELOCIPEDE.

The Schedule referred to in these Letters Patent and making part of the same.

Be it known that I, SAMUEL M. SKIDMORE, of Brooklyn, in the county of Kings, and State of New York, have invented certain new and useful Improvements in "Velocipedes;" and I do hereby declare that the following is a full, clear, and exact description thereof, reference being had to the annexed drawings, and to the letters of reference marked thereon, in which—

Figure 1 is a side view of said velocipede.

Figure 2 shows the under side of the frame, having the several parts arranged thereon.

The several letters in each figure represent like parts.

The part marked A in said drawings, represents the frame of the velocipede.

The parts marked B, represent the seats.

C C' are the driving-wheels.

D D', the steering, or guiding-wheels.

$a\ a'$, connecting-rods, connecting the axle-tree of the steering, or guiding-wheels with the adjusting-levers $b\ b'$, at or near their lower ends.

$c\ c'$, braces, attached, at one end, to the upper part of the adjusting-levers $b\ b'$, and the other end thereof so arranged, as to connect with the frame at points more or less distant from the levers $b\ b'$, so as to hold them at any angle desired.

$d\ d'$ are friction-rollers, or wheels, over the axles of the driving-wheels, and so arranged that their peripheries rest on these axles, at or near a point in line with the centre of the friction-wheel, or roller, and revolve with said axles.

$e\ e'$ are the axles for the driving-wheels.

$f\ f\ f$ are studs, or bearings for the journals of the driving-wheel axles, the one on either side also containing the friction-wheel, resting on the journal of the driving-wheel axle.

$g\ g'$ are driving-rods, or bars, by means of which power is applied by the hands to the axles of the driving-wheels, and the driving-wheels turned.

$h\ h'$, stirrups, or foot-pieces for the feet of the operator to actuate the levers $b\ b'$, and thereby, through the connecting-rods, change the line of motion, or direction of the guiding-wheels.

Some of the special advantages of velocipedes constructed and operated according to my present improved plan, are, that the operator is enabled, by the use of the guiding, or steering-mechanism herein described, to change, or vary the direction, or line of movement of the velocipede, with great ease, regularity and accuracy, causing it, when desired, to move in direct lines backward or forward, or on fixed curves within a large or small space, or room, and to vary the course, or line of movement, as often as desired, without diminishing speed, or deranging, or getting out of adjustment, any of the parts.

The driving-wheel axles being in two parts, separate and distinct from each other, and operated by a separate and distinct force applied to each of them, enable the operator to turn one of the driving-wheels with greater or less speed than the other, as desired, and, in connection with the adjustable levers, or one of them, operated by the foot, to vary the course of the velocipede with great ease and regularity, without diminution of speed, derangement of parts, or risk of accident.

The friction-wheels, or rollers, arranged substantially as described, greatly facilitate the movements of the driving-wheels, inasmuch as the driving-wheel axles turn with the driving-wheels, and are permanently and securely connected therewith.

The driving-wheels have each a separate and independent axle, and are operated by separate and distinct forces applied to each axle, through the driving-rods, or bars. These axles are each made somewhat in the form of a double crank, or curved in the middle, with straight arms on either side.

The outer arm of each of these driving-axles passes through a bearing in the lower part of the studs $f\ f$, extending downward from the frame A, on each side, under said friction-wheels, or rollers, sufficiently far beyond the studs, to form a journal for the driving-wheel hub on the outside of said studs, and the inner arm of each of said driving-axles has its bearing in the stud $f$, projecting downward from the frame, at or near the centre, between the studs on either side. The several bearings for the driving-wheel axles, of course, should be on the same, or very nearly the same horizontal line.

The lower end of each of the driving-rods, or bars $g\ g'$, is connected to the driving-wheel axles, at or near the centre of each axle, and said bars, or rods extend up near the seat of the operator, so as to be conveniently reached and operated by him, and by means of which rods, or bars, power is applied, separately, to the driving-wheels and axles, and they are thereby caused to turn backward or forward, and the velocipede moved in either direction, or on a curve, as desired.

As these driving-wheels and axles are operated by separate power applied to each, it will be seen that they can be turned at the same or different velocities, or one can be turned while the other remains nearly or quite stationary, and when it is desired to move the velocipede in a curvilinear direction, the lower ends of the braces $c\ c'$ being detached from the frame and laid one side out of the way, and the adjusting-levers free to be operated with the foot, the velocipede may be readily and easily turned in any curve desired, by pressing forward the top of the adjusting-lever with the foot, on one side, thereby bringing the steering, or guiding-wheel on the other side of the frame, toward the driving-wheel axle on that side, and, consequently, throwing further back the other steering, or guiding-wheel, and, at the same time, operating the driving-wheel and axle on the side of the lever pressed forward, and giving little or no motion to the other driving-wheel. In this way, the velocipede may be easily turned to the right or left, in any curve desired, and as often as required, and it can be easily moved backward or forward, in a straight or curved line.

When it is desired to adjust the guiding-mechanism so as to cause the velocipede to move in a given circle, of greater or less diameter, either backward or forward, the lower ends of the braces c c' are securely attached to the frame, in some suitable way, so as to bring the upper arm of one lever back, and the upper arm of the other lever forward, thereby causing one of the steering, or guiding-wheels to approach nearer to the driving-wheel axle, and, consequently, throwing the other further back.

The braces, being secured to the frame at their lower ends, of course keep the guiding, or steering-wheels adjusted in the same relative position to each other; and as power is applied to one or both the driving-wheel axles, the velocipede is moved backward or forward on the fixed circle, or curve, for which the levers and guiding-wheels have been adjusted.

In the drawings, these braces are represented as turned, or bent, at their lower ends, so as to fit into holes in the side-pieces of the frame A. These holes being at variable distances from the lever on each side of the frame, enable the bent part of the braces, at their lower ends, to be inserted into these holes, at such relative distances from the levers, as to adjust the guiding and steering-wheels so that the velocipede may be run on a greater or smaller circle, or curve, as desired.

It is not very material in what way the lower ends of these braces are secured to the frame, provided the arrangement for doing it is such, that they may be readily attached and detached, as desired, and at such relative distances from the levers, as may be required. I do not, therefore, claim any special mode of securing them, but regard the way described a convenient and secure way of doing it.

When these braces are not in use, they are to be turned forward out of the way, and held there by any convenient means.

In the drawings hereto annexed, three seats are represented on the frame of the velocipede, and these seats are shown as facing only in one direction, but in the construction of my improved velocipede, the number and arrangement of seats may be varied, and the seats made stationary or reversible, or the backs of the seats may be reversed, as desired, no particular number or arrangement of seats being required, except, of course, in the use of said velocipede, the seat for the operator must be so located as to enable him to operate the driving-rods, or bars with his hands, and the adjusting-levers with his feet.

In the drawings, the friction-wheels, or rollers are shown as having their centres over the driving-wheel axles. I regard this the best arrangement to facilitate and aid the movements of these axles, but they may be used with more or less advantage, by placing the centres of these friction-wheels, or rollers directly under the driving-wheel axles. The drawings also show the driving-wheels as being of the same or nearly the same diameter, as the steering, or guiding-wheels.

I do not intend to limit myself to this relative arrangement of diameters between the driving and steering, or guiding-wheels, but to include driving-wheels of greater or less diameter than the guiding, or steering-wheels, though I prefer making the driving-wheels of the same or greater diameter than the guiding, or steering-wheels. Nor do I intend to limit myself to any specified size or distance of parts, provided their relative arrangement to each other, and their construction and operation are substantially the same as herein described.

The axle-tree of the guiding, or steering-wheels is not made to turn with the wheels, as is the case with the axles of the driving-wheels, but is permanently connected, at the centre, with the frame, or with some part, in connection with the frame, by a pin or other suitable device, in such manner as to allow the axle-tree to move laterally, as one or the other connecting-rod is drawn, thereby bringing one of the guiding-wheels forward, and throwing the other back, as the line of movement of the velocipede is desired to be changed.

The limit of lateral movement of the guiding-wheels in either direction is, of course, fixed and regulated by the inflexible connecting-rods, attached, at one end, to the guiding-wheel axle-tree, and at the other end to the lower arms of the adjusting-levers, these levers also being connected with the side-pieces of the frame, or with some other convenient part, by a pin or other suitable device, so as to allow the upper and lower arms of said levers to be moved freely backward and forward, when not held in place by the braces, as described.

In the construction and operation of my said improved velocipede, I do not wish to limit myself to only two driving-wheels, with their axles and driving-rods arranged as above described, but to include two or more driving-wheels, with their axles and driving-rods separately arranged, and operated as above described, and also one or more cranks for the driving-rods on each axle, operated as above described.

Having thus described my said improved velocipede, What I claim as new therein, and desire to secure by Letters Patent, is—

1. The arrangement and combination of the hand-driving rods g, the two crank-axles e e', rods a a, levers b b', for operating the velocipede by both the hands and feet, substantially in the manner and for the purposes set forth.

2. Also, the combination of the friction-rollers d, in the studs f f, with the crank, or driving-axle, substantially as set forth.

SAMUEL M. SKIDMORE.

Witnesses:
M. B. ANDRUS,
SETH M. ELDREDGE.